United States Patent [19]
Banham et al.

[11] Patent Number: 5,415,765
[45] Date of Patent: May 16, 1995

[54] WATER TREATMENT SYSTEM

[75] Inventors: William S. Banham, Garrettsville; Stephen W. Cook, Chesterland; Larry W. Stacy, Mantua, all of Ohio

[73] Assignee: Kinetico Engineered Systems, Inc., Newbury, Ohio

[21] Appl. No.: 44,186

[22] Filed: Apr. 7, 1993

[51] Int. Cl.$^6$ .................................................. C02F 1/42
[52] U.S. Cl. ................................... 210/142; 210/269; 210/279
[58] Field of Search ............... 210/677, 678, 670, 673, 210/278, 277, 279, 269, 672, 289, 291, 290, 792, 793, 794, 795, 141, 142, 807

[56] References Cited

U.S. PATENT DOCUMENTS

| | | | |
|---|---|---|---|
| 654,479 | 7/1900 | McNally | 210/279 |
| 2,692,244 | 10/1954 | Kunin et al. | 210/678 |
| 2,773,829 | 12/1956 | Hunting | 210/279 |
| 2,773,830 | 12/1956 | Farmer et al. | 210/793 |
| 2,973,097 | 2/1961 | Snider | 210/279 |
| 3,143,500 | 8/1964 | Damgaard | 210/279 |
| 3,169,110 | 2/1965 | Rudelick | 210/278 |
| 3,240,699 | 3/1966 | Duff et al. | 210/678 |
| 3,317,044 | 5/1967 | Marks | 210/279 |
| 3,402,126 | 9/1968 | Cioffi | 210/279 |
| 3,617,558 | 11/1971 | Jones | 210/279 |
| 3,655,587 | 4/1972 | Bouchard et al. | 210/678 |
| 3,711,401 | 1/1973 | Hamilton et al. | 210/677 |
| 4,163,717 | 8/1979 | Blind et al. | 210/672 |
| 4,220,531 | 9/1980 | Robison | 210/291 |
| 4,379,855 | 4/1983 | Down et al. | 210/677 |
| 5,022,994 | 6/1991 | Avery et al. | 210/269 |
| 5,069,779 | 12/1991 | Brown et al. | 210/269 |
| 5,116,511 | 5/1992 | Green et al. | 210/673 |

Primary Examiner—Cynthia L. Nessler
Attorney, Agent, or Firm—Watts, Hoffmann, Fisher & Heinke Co.

[57] ABSTRACT

A method and apparatus for regenerating an ion exchange resin utilizing recycled solution or reused regeneration solution. At least one tank containing an ion exchange material is provided having a spaced first and second ports which define a fluid flow path through the ion exchange media. Water to be treated is introduced at an inlet and flows through the resin bed ultimately being discharged at the outlet. A polishing zone is located at the outlet which includes highly regenerated, uncontaminated resin. The media is regenerated in a multi-step process in which regeneration solution is introduced into the resin bed in two separate steps. In the first step, a first regeneration solution is introduced into the resin bed upstream from the polishing zone, flows in a countercurrent direction and is discharged through the inlet of the tank. A second regeneration fluid is introduced at the outlet of the tank and flows in a countercurrent direction through the entire resin bed. The first solution is introduced by an injection conduit that extends from a fitting located at the tank inlet and terminates in slots that open upstream of the polishing zone. Following the regeneration solution steps, the injection conduit is flushed and the entire bed rinsed, with rinse water, using several rinse steps.

16 Claims, 4 Drawing Sheets

WATER TREATMENT SYSTEM

TECHNICAL FIELD

The present invention relates generally to water treatment systems and in particular to a water treatment system having at least one resin tank and a means for utilizing lower grade regeneration chemistry to regenerate an exhausted resin while maintaining high quality water output.

BACKGROUND ART

Water treatment systems such as water softeners and deionizers are used in both industrial and residential applications. In the case of residential applications, water treatment units are typically small in size and include one or two resin tanks which treat the incoming water. When a single resin tank is used, water service to the household is usually interrupted when regeneration is needed. In a two tank treatment system continuous water service is provided by having one tank on-line at all times. The other tank is regenerated and maintained off-line until the first tank is exhausted and requires regeneration.

Water treatment units used in industrial applications usually operate on the same principal as residential treatment units. However, for at least some industrial applications, the quantity of treated water needed mandates either a much larger resin tank or a multiplicity of tanks in order to support the required flow rate.

When a single resin tank is used in an industrial application, it normally must be very large in order to provide sufficient service time before requiring regeneration. When regeneration is required, the flow of regeneration chemistry and rinse water out of the tank can be substantial and may require the need for even larger equipment to treat the regeneration influent. In a single vessel system, the required treatment equipment for the regeneration influent can be very costly and remains idle most of the time.

U.S. Pat. No. 5,069,779, which is hereby incorporated by reference, is owned by the assignee of the subject application and discloses a large scale water treatment system. The system disclosed in this patent includes multiple cation and anion tanks which are regenerated using fresh regeneration solutions periodically. The cation resins are typically generated using an acid based solution. The anion resins are typically regenerated with a caustic solution, such as a sodium hydroxide solution. In order to produce highly purified deionized water from cation and anion exchange units, it is important that the lower portions of the resin beds not become contaminated with unwanted ions, such as metal ions. For this reason, virgin acid and caustic solutions are used, in a typical application, to regenerate exhausted cation and anion resins.

Many industrial processes produce waste acid or caustic solutions. As an example, in the manufacture printed circuit boards, various acid solutions are used which, during processing, become contaminated with copper, sodium and other ions. Relatively inexpensive recovery methods can be used to, at least partially remove these contaminating ions. However, it is usually not cost effective to remove all contaminating ions to produce a virgin acid solution suitable for regeneration in systems where high quality deionized water is needed.

It is desirable to be able to use partially purified acid or caustic solutions in the regeneration of a cation and anion resin used in industrial applications in order to reduce chemical costs by reducing the need for fresh chemicals and to reduce the discharge of salts to the environment. It is also considered desirable to reuse regeneration solutions at least for part of a regeneration cycle.

DISCLOSURE OF THE INVENTION

The present invention provides a new and improved regeneration method and apparatus which utilizes a first regeneration solution that at least partially regenerates a water treatment bed or resin. The first regeneration solution may be recycled, lower grade or previously used solution.

The disclosed embodiment is described in connection with the regeneration of a cation resin. It should be understood, however, that the invention is equally applicable to the regeneration of an anion and other resins that require periodic regeneration. Typically, a cation resin is regenerated with an acid based solution, whereas an anion resin is regenerated with a caustic solution.

According to the invention, at least one treatment tank or vessel is provided having spaced first and second ports and containing a treatment material defining a fluid flow path between the first and second ports. Fluid, such as water to be treated, is introduced at one of the ports that forms an inlet, travels through the treatment bed and is discharged from the tank via the second port or outlet. For water deionization applications, the tank contains a cation resin which is operative to remove cations from the water as it passes through the bed.

To produce highly purified de-cationized water, a polishing zone is defined at the tank port through which the water to be treated is discharged. In other words, the water being treated travels through the polishing zone just before emerging from the tank outlet. The polishing zone is intended to comprise highly regenerated, uncontaminated treatment media which operates to perform a final cleansing and traps virtually all remaining cations in the water just before it is discharged from the tank. It should be understood, however, that in the preferred embodiment, the media is the same throughout the tank, i.e., the polishing zone contains the same media as the rest of the tank.

In the preferred embodiment, the regeneration of the treatment bed includes the use of two separate regeneration solution introduction steps. The first regeneration solution is introduced into the resin bed substantially adjacent the polishing zone and flows towards the tank port opposite to the port at which the polishing zone is located. In the illustrated embodiment, water to be treated is introduced at the inlet port, flows through the resin bed and is discharged through the outlet port. The polishing zone, as indicated above, is located at the outlet end of the tank. In the first regeneration solution step, the first regeneration solution is introduced in a region spaced from the outlet port and substantially adjacent the polishing zone, travels in a direction away from the polishing zone and is discharged through the inlet port. In other words, the flow of regeneration solution is countercurrent as compared to the flow of water being treated during a normal service cycle.

When defined in terms of the flow direction that occurs during a normal service cycle, the first regeneration solution is introduced "upstream" of the polishing zone and travels in an "upstream" direction since, in the preferred embodiment, the flow of regeneration solution is "countercurrent", i.e., in a direction opposite to the direction of water flow during a normal service cycle, when defined in terms of the flow direction of regeneration solution, the first regeneration solution is actually introduced "downstream" of the polishing zone.

Following this regeneration step, regeneration solution is introduced at the outlet port of a tank and travels through the entire resin bed, in a countercurrent direction and is discharged through the inlet. In the preferred and illustrated embodiment, this second regeneration solution step utilizes a high grade or new regeneration solution which fully regenerates the polishing zone and completes the regeneration of the resin bed upstream of the polishing zone. In the disclosed embodiment, the first regeneration solution comprises a recycled acid solution or reused regeneration solution which, if passed through the entire resin bed, would leave contaminating ions in the polishing zone. With this multi-step regeneration method, less expensive regeneration solutions can be used to regenerate the bulk of the resin bed and only requires the use of minimal amounts of expensive, higher quality regeneration solution to maintain the highly regenerated, uncontaminated polishing zone by which highly purified de-cationized water is produced.

In the preferred and illustrated embodiment, the first regeneration solution is introduced into the resin bed, upstream of the polishing zone using an injection conduit or pipe that extends into the treatment bed and which is in fluid communication with a reservoir of the first regeneration solution. The regeneration solution introduced by this injection conduit enters the treatment tank intermediate the first and second ports. By blocking or inhibiting flow of fluid from the outlet of the tank as by closure of a valve, the first regeneration solution leaving the conduit is forced to travel in a countercurrent direction towards the tank inlet.

In a more preferred embodiment, the treatment tank is oriented vertically with a port defining the inlet for water to be treated located at the top of the tank and the port defining the outlet located at the bottom of the tank. In normal service, water to be treated enters the top of the tank, travels through the treatment bed and is discharged through the outlet port at the bottom of the tank. In the illustrated embodiment, a fitting assembly is mounted to the tank and defines a passage through which fluids (water to be treated or regeneration solution) enters or leaves the top tank port. The conduit for injecting the first regeneration solution, upstream of the polishing zone, extends through the tank fitting and terminates in slots located above the polishing zone (when the tank is oriented vertically). With the disclosed embodiment, two fluid connections are made at the top of the tank, one of which fluidly connects the top port of the tank with conduits for conveying fluid to and from the top of the tank. The other connection couples the source of the first regeneration solution with the injection conduit.

The disclosed invention is especially useful in a large industrial de-ionization process in which cation and anion resins are used to produce deionized water. In many industrial applications, sources of acid based or caustic based solutions are available. With the disclosed invention, these solutions can be used to at least partially regenerate portions of the cation and anion resin or media beds, respectively.

A industrial application is disclosed which utilizes the present invention. In this disclosed application, an overall system controller controls an opening and closing of valves associated with the resin tanks to place a tank in service when regenerated and to regenerate an exhausted tank. As indicated above, the present invention is described in connection with the cation section of a deionization system, but it should be understood that the principles of the invention can be applied to the anion section.

In the preferred regeneration cycle, the second regeneration solution step is followed by a slow countercurrent rinse in which de-cationized water is introduced at the outlet of the tank and travels through the polishing zone and then through the remainder of the resin bed finally being discharged through the tank inlet. Concurrently with this slow upflow rinse, the injection conduit for injecting the first regeneration solution is flushed with de-cationized water. The flushing water is also discharged with the rinse water through the top of the tank. The water used to flush the conduit does not flow through the polishing zone. In the preferred embodiment, the slow concurrent rinse is followed by a high flow countercurrent or upflow rinse which is then preferably followed by a downrinse, i.e., de-cationized water is introduced at the inlet of the tank and flows through the resin bed and is discharged through the outlet. The regenerated tank is then placed back in service.

Additional features of the invention will become apparent and a full understanding obtained by reading the following detailed description made in connection with the accompanying drawings:

BEST MODE FOR CARRYING OUT THE INVENTION

Figure 1:
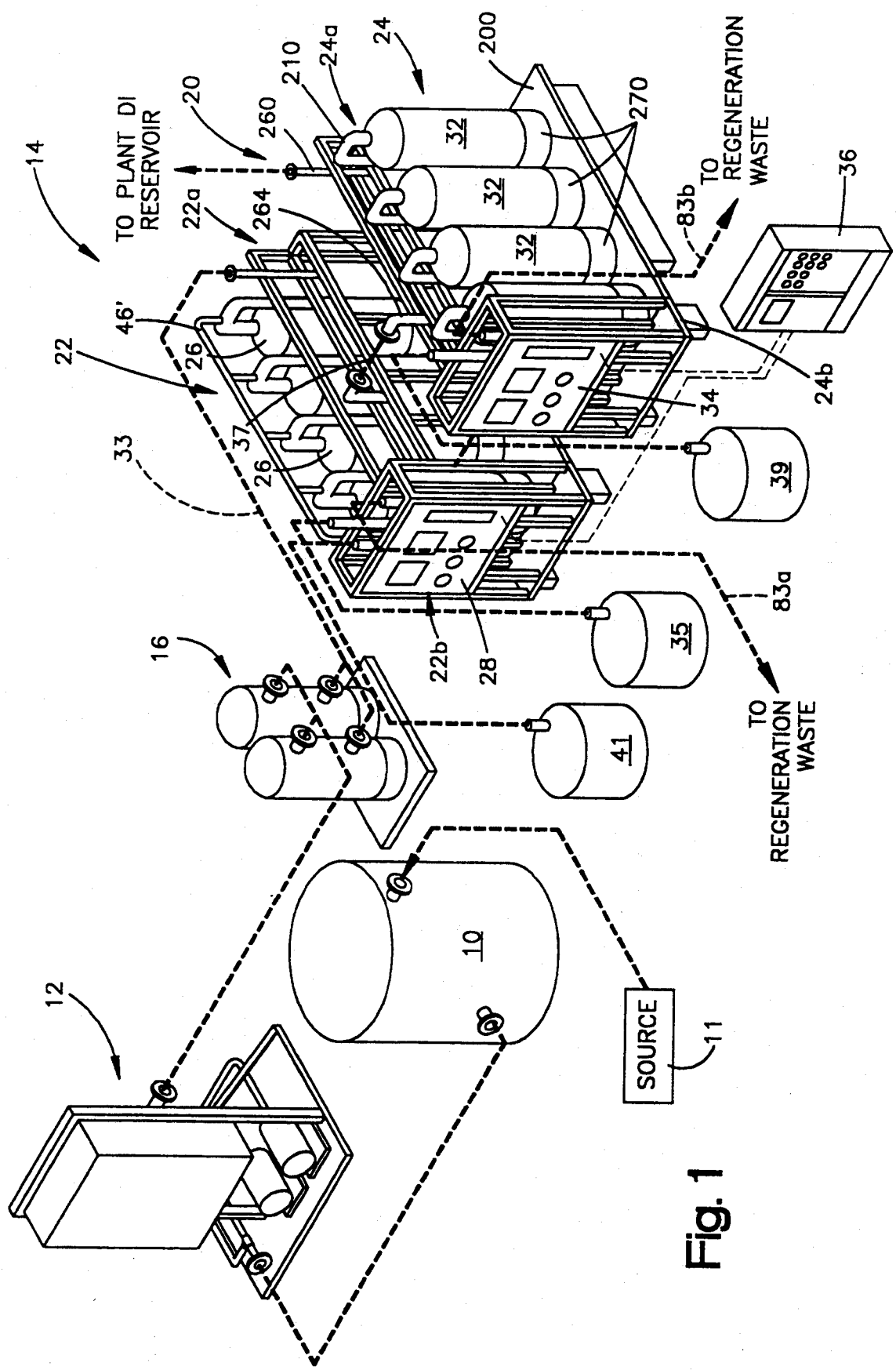
FIG. 1 is a perspective view of an overall industrial, water treatment system embodying the present invention.

FIG. 1 illustrates the overall construction of a large scale water treatment system embodying the present invention. The invention is being disclosed as part of a plant deionization system. It should be understood however, that the present invention can be adapted to a variety of water treatment applications and should not be limited to the disclosed deionization application.

The disclosed water treatment system includes a holding tank 10 for receiving and/or accumulating raw water to be treated from a source 11, a pump unit 12 for drawing water from the holding tank 10 and pumping it through a water treatment process line, indicated generally by the reference character 14. The overall process line 14 may include a variety of water treatment devices such as mechanical filters (not shown) or carbon filters 16 for removing solids from the raw water before the water enters a deionization unit 20 constructed in accordance with the present invention.

The deionization unit 20 includes a pair of skid mounted cation and anion subassemblies 22, 24. In the illustrated embodiment, the cation skid 22 includes four resin tanks 26, a control panel 28 and all the necessary piping and valving for interconnecting the cation tanks 26 and for controlling the regeneration of an exhausted tank.

The anion subassembly 24 is similarly configured and includes four anion tanks 32, an associated control panel 34 and piping and valving necessary to interconnect the tanks 32 with each other and with the control panel 34.

The cation unit 22 is connected to the source of water to be treated via conduit 35, to the anion unit 24, to a source of fresh or new regeneration chemistry 35 and finally to a source of power and/or to a system controller 36.

An input to the anion unit 24 is connected to the output of the cation unit 22 via conduit 37. The output of the anion unit is connected to a plant supply conduit 38. A source of fresh or new regeneration chemistry 39 is connected to the unit 24 and finally a connection is made to a source of power and/or the system controller 36.

Referring again to FIG. 1, to facilitate installation and maintenance, the ion exchange subassemblies 22, 24 are divided into two sections. In particular, the cation assembly 22 is divided into a tank section 22a and a regeneration section 22b.

Figure 2A:
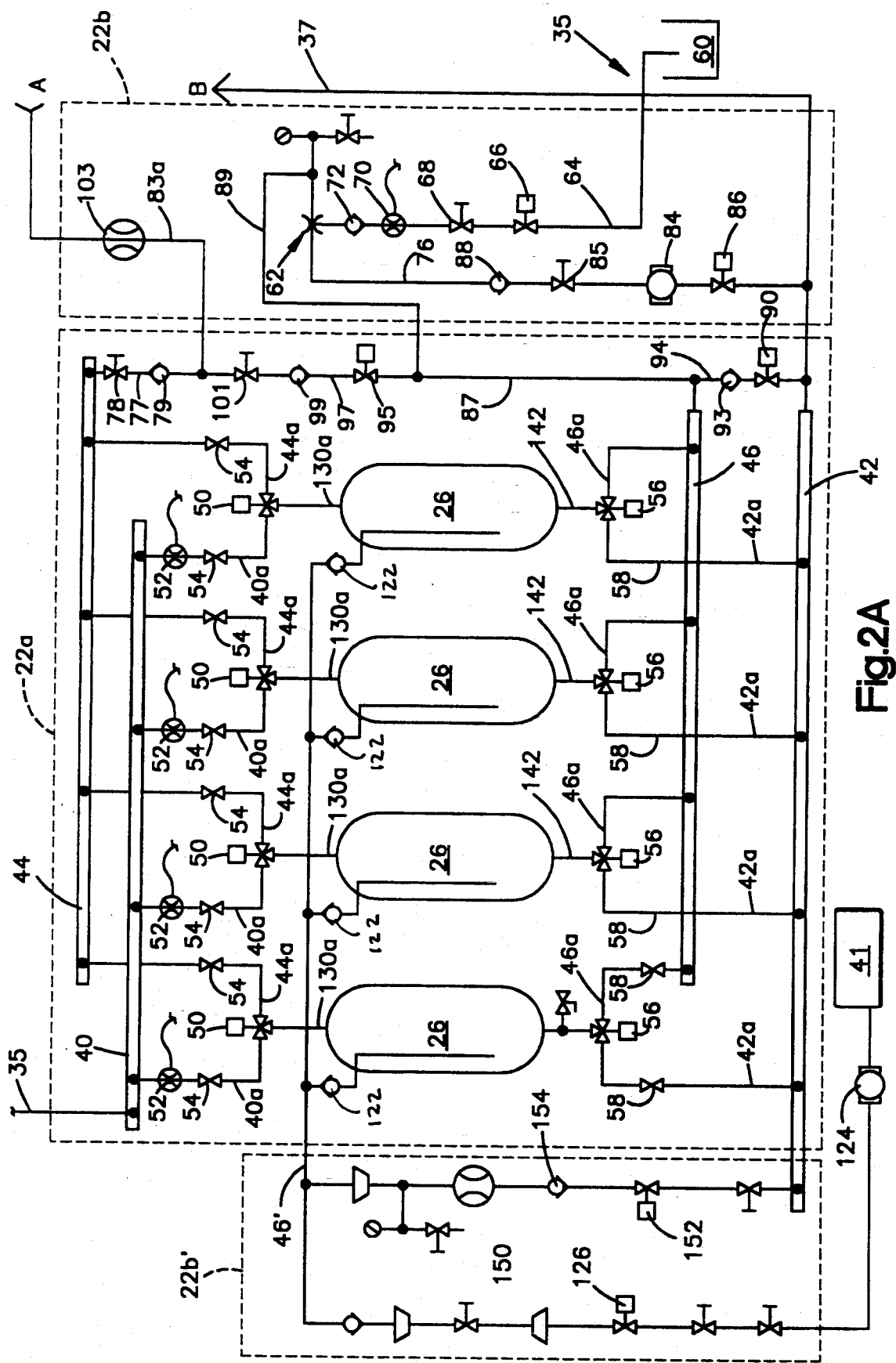
FIGS. 2A and 2B together form a schematic representation of a portion of the treatment system shown in FIG. 1; and, FIG. 3 is a sectional view of one of the resin tanks constructed in accordance with the preferred embodiment of the invention.

According to the invention, the regeneration section 22b also includes the components and plumbing encompassed by the dash line 22b' in FIG. 2A. As will be more fully explained below, this proportion 22b' of the regeneration section 22b, controls the communication of a source of lower grade regeneration chemistry (stored in the reservoir 41) to a resin tank 26 that is being regenerated. The lower grade regeneration solution contained in the reservoir 41 may take various forms. In regenerating a cation resin, an acid based solution is normally required. In the printed circuit board manufacturing industry, numerous acid solutions of 5% to 20% acid strength are available as part of the manufacturing process. These acid solutions may be contaminated with copper, sodium and other ions. This solution can be partially purified using relatively inexpensive processes such as electrolysis and then stored in the reservoir 41. The lower grade regeneration solution in the tank 41 may also be previously used regeneration solution which may, or may not, be partially purified. As will be more fully explained below, this lower grade regeneration solution is used to at least partially regenerate a portion of the resin in a tank being regenerated. After a partial regeneration step, the entire resin column in the tank is then regenerated using high grade or new regeneration chemistry from the source 35.

In the described embodiment, the anion unit 24 is made up of two separate pre-assembled sections, namely a tank section 24a and a regeneration section 24b. During installation, the respective cation sections 22a, 22b and the anion sections 24a, 24b are interconnected.

In the illustrated embodiment, the anion regeneration section 24b does not include a provision for introducing lower grade regeneration solution into an anion tank during regeneration. It should be understood, however, that the present invention can be used either with a cation resin tank or a anion resin tank, or both. To simplify the explanation, the invention will only be described in connection with the cation section of a water deionization process.

By mounting the sections on skids or pallets, transport and movement of the units are facilitated as well as maintenance and service. It should understood, however, that for some applications the tank and regeneration sections may be mounted on a common platform. This disclosed mounting and sectional construction is more fully disclosed in U.S. Pat. No. 5,069,779, which is hereby incorporated by reference. The disclosed tank mounting features and the use of the skids and pallets to facilitate installation do not form part of the present invention. These features are included here for illustration purposes.

With the disclosed skid mounting of the cation and anion units, the deionization system can be easily installed with the minimal amount of effort and time. Moreover, the units can be easily moved or replaced if necessary.

Figure 2B:
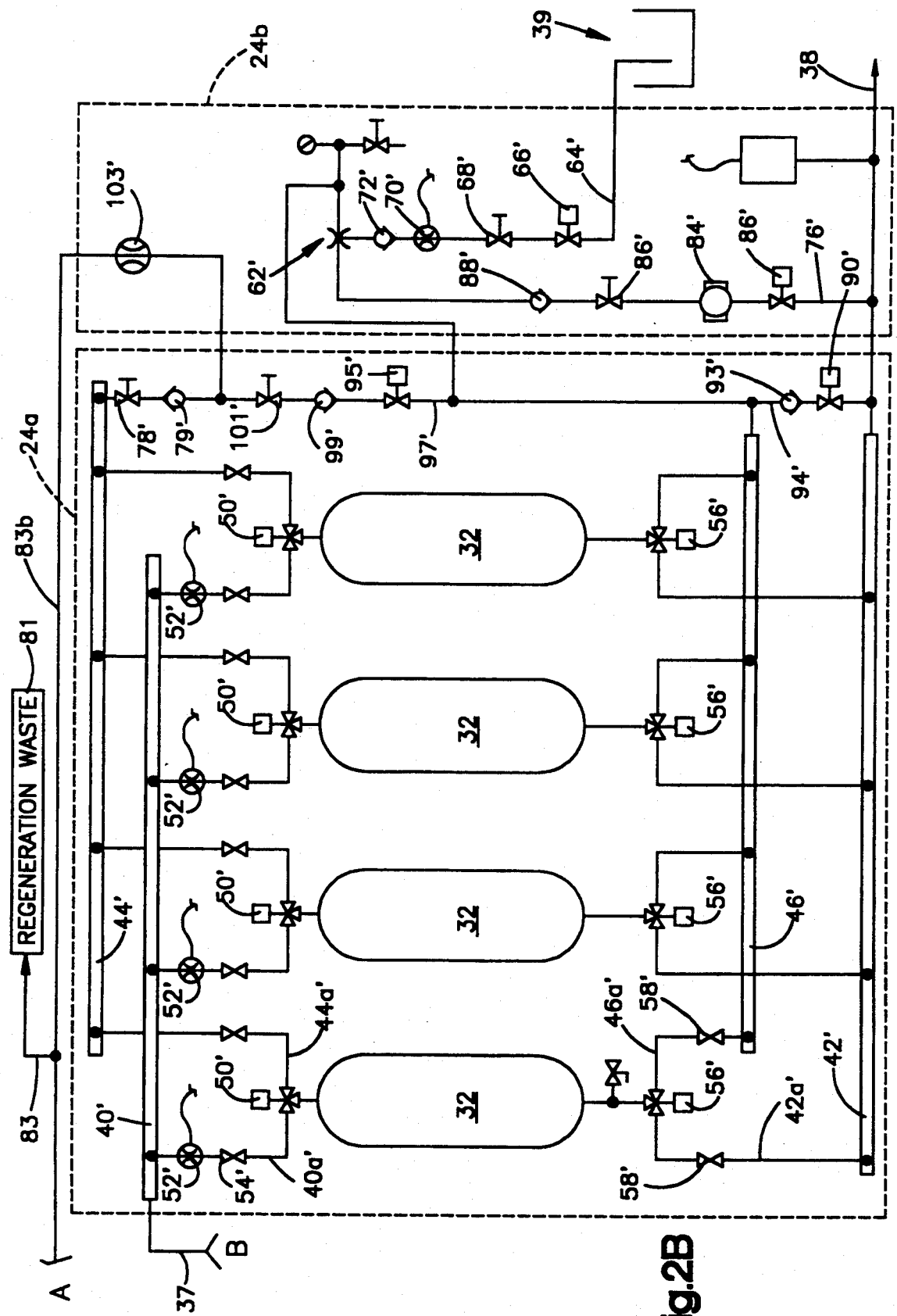

FIGS. 2A and 2B illustrate, schematically, the construction of the water treatment system. The cation and anion units 22, 24 are similarly configured. In the illustrated construction, four resin tanks are employed in each of the ion exchange subassemblies. It should be understood, however, that the invention is not limited to four tanks. At least some aspects of the present invention may be utilized in single tank installations.

In addition, the present invention is being described in connection with a deionization process. The invention itself is not limited to deionization processes and is equally applicable to water softening systems or any other water treatment system in which water to be treated is passed through a treatment material that requires periodic regeneration. For example the present invention is adaptable to a water treatment system that employs a polymeric adsorbent for removing organic material from an aqueous stream. An adsorbent resin is available from Rohm And Haas Company and is sold under the trademark Amberlite.

Referring to FIG. 2A, the cation subassembly 22 includes the tank section 22a and the regeneration section 22b (which, as described above, includes the components designated by the dashed line 22b'). The tank section 22a includes four cation tanks 26, each containing a suitable cation resin. Fluid connections are made to the top and bottom of each tank 26. The subassembly 22 also includes four manifolds 40, 42, 44, 46 to which each tank 26 is connected through valving and conduits to be described. The manifolds 40, 42, 44, 46 may each comprise a common conduit to which each tank 26 is connected. In addition, each tank 26 is connected to an auxiliary manifold or conduit 46a.

The manifold 40 is an influent manifold and is connected to the source conduit 35 by a standard plumbing connection 48 (shown in FIG. 1). In the illustrated apparatus, the source conduit 35 is connected to the output of the carbon filters 16. The source conduit 35 delivers water to be treated to the influent manifold 40. The communication of water to be treated from the manifold 40 to a given tank 26 is controlled by a motorized three-way valve 50 and a branch conduit 40a. In the illustrated embodiment, the branch conduit 40a includes a flow sensor 52 for monitoring the quantity of fluid delivered to an associated tank 26. The branch conduit 40a may also include a manual shut-off valve 54 for isolating the influent manifold 40 from a tank 26 when the tank is being serviced or replaced.

The manifold 42 is a "product" manifold. The bottom of each tank 26 is connected to the product manifold 42 by way of a branch conduit 42a and a motorized three-way valve 56. Each branch conduit 42a may include a manual shut-off valve 58 for isolating a tank 26 from the product manifold 42.

When a given tank 26 is in service and treating water, the motorized valves 50, 56 are operated by the system controller 36 (the system controller 36 is more fully described in U.S. Pat. No. 5,069,779, which is hereby incorporated by reference) which causes the branch conduit 40a to be placed in fluid communication with the top of the tank 26 and the branch conduit 42a to be placed in fluid communication with the bottom of the tank 26. Water to be treated is delivered from the influent manifold 40 to the top of the tank by way of the three-way valve 50 and the branch conduit 40a. The water travels through the tank and is delivered to the product manifold 42 by way of the valve 56 and the branch conduit 42a.

The top of each tank 26 is also connected to the regeneration discharge manifold 44 by means of a branch conduit 44a.

The bottom of each tank 26 is connected to the regeneration solution delivery manifold 46 by means of a branch conduit 46a. The fluid communication between the tank 26 and the branch passages 44a, 46a are also controlled by the three-way valves 50, 56.

Figure 3:
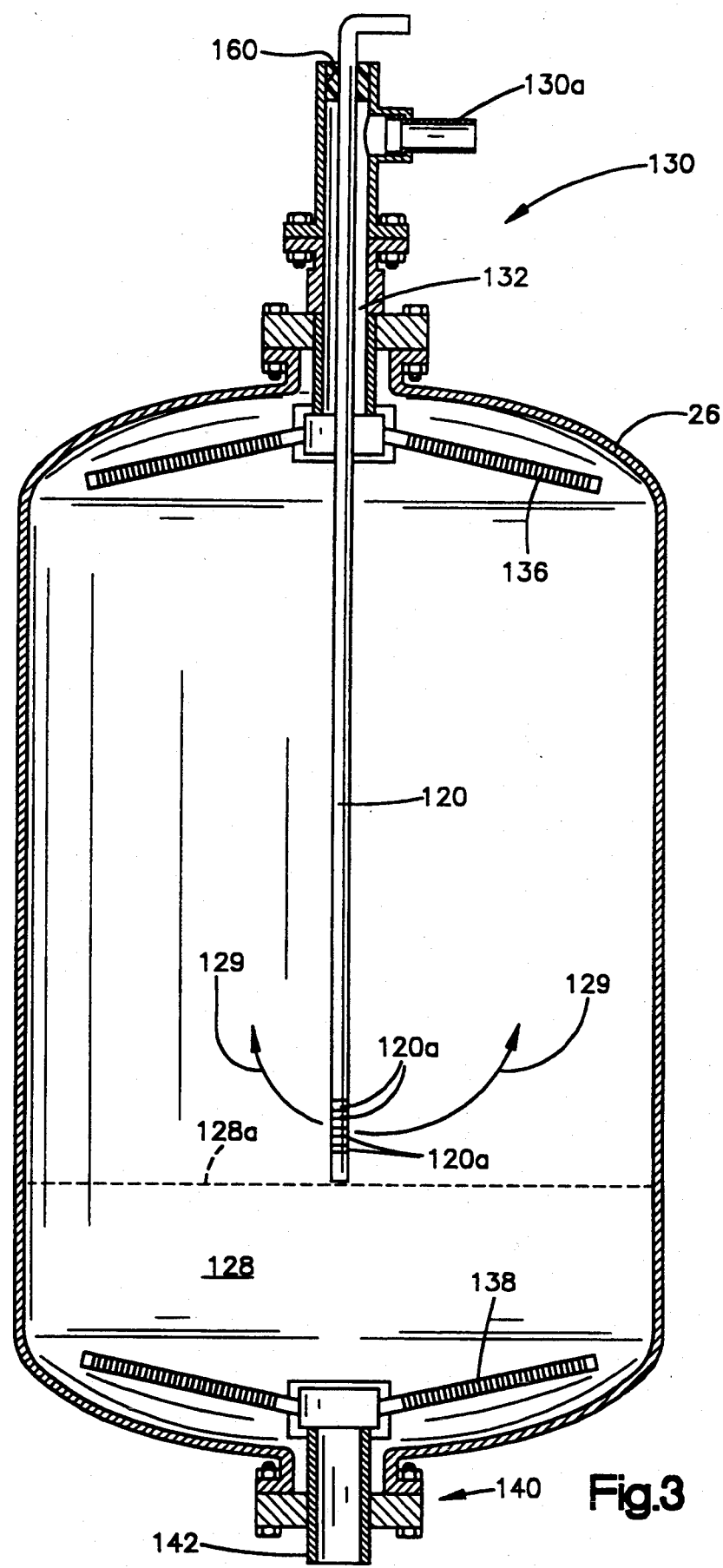

Referring to FIG. 3, each tank 26 includes an auxiliary regeneration solution injection pipe or conduit 120. The conduit 120 is used to inject or admit regeneration solution into the resin bed a predetermined distance above the bottom of the tank 26, i.e., intermediate the top and bottom of the tank. The conduit 120 includes a plurality of slots 120a through which the solution is discharged into the resin bed. Each auxiliary conduit 120 is connected to the auxiliary regeneration manifold 46' via check valve 122. The check valves 122 allow fluid flow from the manifold 46' into the injection conduit 120, but prevent reverse flow. The communication of regeneration solution from the reservoir 41 is controlled by a valve 126, the opening and closing of which is controlled by the system controller 36. During a portion of the regeneration cycle, as will be more fully described, the valve 126 is opened and a pump 124 energized to pump regeneration solution from the reservoir 41 into a tank 26, being regenerated, via the conduit 120.

When a tank 26 requires regeneration, the three-way valve 50 is operated to terminate the fluid communication between the top of the tank 26 and the branch conduit 40a and is moved to a position at which the top of the tank 26 is communicated with the branch passage 44a. The three-way valve 56 is operated to terminate communication between the bottom of the tank 26 and the branch passage 42a and is then rotated to a position at which the bottom of the tank 26 is placed in fluid communication with the branch conduit 46a.

With the three-way valves 50, 56 positioned as described, regeneration solution from either the lower grade solution source 41 or the regeneration solution source indicated generally by the reference character 35 (but not both), is communicated to the tank being regenerated. The solution flows upwardly through the tank and is discharged through the conduit 44a.

Other valves to be described determine which of the two regeneration solutions are communicated to a tank being regenerated.

As indicated above, the lower grade regeneration solution is communicated to the auxiliary manifold 46' from the source 41, whereas the higher grade or new regeneration solution is communicated to the regeneration supply manifold 46 from the regeneration chemistry source 35.

In the illustrated embodiment, the regeneration solution source 35 comprises a reservoir of new regeneration chemistry 60 which is connected to an aspirator or eductor 62 through a conduit 64 which includes a control valve 66, metering valve 68, a flow sensor 70 for monitoring the quantity of regenerant chemistry delivered to the eductor and a check valve 72 for inhibiting reverse flow along the conduit 64. The regeneration solution that is delivered to a tank being regenerated is created by passing product water through the eductor 62 which as is known, draws regeneration chemistry from the conduit 64. Product or in this case de-cationized water is delivered to the eductor 62 through a conduit 76 which is connected to the product manifold 42.

Returning to FIG. 3, in normal service, water being treated enters the top of the tank, via a fitting, generally indicated by the reference character 130. The fitting includes a connecting pipe 130a which is fluidly coupled to the motorized valve 50 (shown in FIG. 2a). The fitting includes a passage 132 that fluidly connects the pipe 130a with a distributor 136, located at the top of the tank. Water to be treated is discharged at the top of the tank through the distributor 136 and flows downwardly to the resin bed and is discharged at the bottom of the tank. The bottom of the tank includes a distributor 138 which is attached to a fitting indicated generally by the reference character 140, which includes a connecting pipe 142 fluidly coupled to the motorized three-way valve 56 (shown in FIG. 2A).

Referring to FIG. 3, the fitting 130 includes a reducer bushing or seal 160 which sealingly engages and supports the conduit 120. As seen in FIG. 3, the injection 120 extends through the fitting passage 132. It should be apparent that the fluid communicated to the conduit 120 does not co-mingle with the fluid flowing through the passage 132 and the connecting pipe 130a.

It has been found that to produce highly purified (de-cationized) water it is important that at least the bottom portion of the resin bed be highly regenerated and contains very little, if any, contaminating ions. By maintaining the "polishing" zone (the region 128 below the dashed line 128a) at the bottom of the vessel, yields extremely high quality water having, in the case of a cation resin, virtually no contaminating cations. In the illustrated tank construction, the polishing zone extends from the end of the injection conduit 120 to the bottom of the tank. In a tank standing 30 or more inches tall, a polishing zone of 18 to 24 inches will produce high quality water.

The present invention maintains a polishing zone of highly regenerated, uncontaminated media at the bottom of a vessel. In preferred regeneration method, the portion of the resin bed above the polishing zone, i.e., above the dashed line 128a, is initially regenerated with regeneration solution from the reservoir 41. This regeneration solution is injected by the conduit 120 above the polishing zone and flows upwardly in an upflow direction (as indicated by the arrows 129). Solution from the reservoir 41 is pumped to the auxiliary conduit 46' by the pump 124. The motorized valve 121 is operated to allow fluid flow from the tank 41 to the conduit manifold 46'. During this regeneration step, the control valve 66 (which controls the communication of new chemistry in the reservoir 60 with the regeneration manifold 46) is closed. The motorized three-way valve 56 is in the position that communicates the conduit 46a with the bottom of the tank. However, due to closure of the valve 66 and other valves to be described, the solution injected by the conduit 120 is prevented from flowing downwardly through the polishing zone 128.

Separate valves for controlling the communication of the auxiliary regeneration conduit/manifold 46' with the tanks 26 are not needed in the illustrated embodiment. When regeneration of a particular tank is initiated, the associated three-way valve 50 communicates the top of the tank with the regeneration solution reservoir 44. This immediately depressurizes the tank being regenerated so that upon activation of the pump 124 in the opening of the valve 126, the auxiliary regeneration solution immediately flows through the associated check valve 122 and into the tank. Since the other tanks are in service and under pressure, the associated check valves prevent flow of the regeneration solution into the tanks.

After traveling through the treatment material in the tank 26, the solution leaves the top of the tank through the valve 50, the branch conduit 44a and is received by the regeneration discharge manifold 44. This regeneration waste leaves the discharge manifold 44 through a branch conduit 77 which includes a throttling valve 78 and a check valve 79. From the conduit 77, the waste is communicated (by a transfer conduit 83) to a waste receiver 81 (shown in FIG. 2B) which may comprise supplementary treatment equipment or a drain. It should be noted here that in the schematic representation provided by FIGS. 2A and 2B, the transfer conduit 83 is shown as an interconnecting, common conduit between the cation and anion sections 22, 24 whereas in FIG. 1, separate transfer conduits 83a, 83b are shown.

Following this initial, preliminary partial regeneration step, new regeneration solution using the new regeneration chemistry from the tank 60 is communicated to the base of a tank so that the fresh or new regeneration chemistry flows upwardly through the entire resin bed. With this arrangement, the resin in the polishing zone 128 is only contacted by the fresh or higher quality regeneration chemistry. By passing only new or higher grade chemistry through the lower region of the tank, a highly regenerated, uncontaminated resin media is maintained at the base of the tank in order to define the "polishing" zone.

The high grade or new regeneration solution is communicated to a tank 26 that is being regenerated by way of the regeneration supply manifold 46, the associated branch conduit 46a and the associated three-way valve 56. Regeneration solution leaves the top of the tank and is received in the regeneration discharge manifold 44 and is discharged in the same manner as the lower grade solution is discharged.

In the illustrated embodiment, the conduit 76 includes a booster pump 84, a control valve 86, a metering valve 85 and a check valve 88 to prevent reverse flow along the conduit. When the valve 56 is operated to communicate the branch conduit 46a with the bottom of the tank, the valve 86 is opened to allow product water to flow along the conduit 76 to the eductor 62 and into the bottom of the tank being regenerated via conduit 87 and conduit 89. Once sufficient regeneration chemistry has been delivered to the eductor, the valve 66 is operated to terminate flow of regeneration chemistry from the reservoir 60 and a slow rinse may then be initiated by allowing the flow of product water to continue through the eductor 62, the conduits 87 and 89, manifold 46 and into the bottom of the tank 26.

Alternately, a fast or high flow rate upflow rinse can be effected by opening a valve 90 which communicates the product manifold 42 directly to the regeneration supply manifold 46 through a branch conduit 94. When the valve 90 is opened, the regeneration circuit is bypassed and product water is allowed to flow directly from the manifold 42 to the manifold 46 via the conduit 94 (which includes a check valve 93 to prevent reverse flow) from where it is communicated to the tank being regenerated through the conduit 46a.

Concurrently with the slow upflow rinse described above, the injection conduit 120 is flushed in order to remove any chemical residue from the conduit. Referring to FIG. 2A, a flushing circuit indicated generally by the reference character 150 is illustrated. In particular, a connection is made between the auxiliary manifold 46' and the "product" manifold 42. The connection includes motorized valve 152, a check valve 154, which prevents flow of fluid from the manifold 46' to the product manifold 42. To perform the flushing step, the motorized valve 154 is open to communicate the product manifold 42 (which contains the de-cationized water) with the auxiliary manifold 46'. The valve 126 is closed and the pump 124 de-activated. The motorized valve 50 of the tank being regenerated communicates the top of the tank with regeneration solution receiving a waste manifold 44. As a result of these connections, the de-cationized water from the manifold 42 flows into the tank 26 being regenerated via the injection conduit 120. This flushing water flows upwardly through the tank and is ultimately discharged into the waste manifold 44.

The disclosed system also has a provision for a downflow rinse, utilizing the source fluid as a rinsing agent. According to this feature, when a downflow rinse is desired, as part of the regeneration cycle, the valve 50 of the tank being regenerated is operated to communicate the source manifold 40 via the branch conduit 40a with the top of the tank 26. The lower valve 56 of the tank being regenerated, however, is left in the position at which it communicates the regeneration supply manifold 46 with the lower end of the tank (via the branch passage 46a). A downrinse control valve 95 disposed in a conduit segment 97 is then opened. The downflow rinse fluid (source fluid from the source manifold 40) travels down through the tank 26 being regenerated, is received by the regeneration supply manifold 46, travels up the conduit 87, through the intermediate conduit 97 and into the transfer conduit 83. The conduit 97 includes a check valve 99 to prevent reverse flow along the conduit 97 and a throttling valve 101 to adjust the flow rate of the rinse. In order to adjust the flow rate of both the downflow rinse (using the throttling valve 101) or the upflow rinse (using the throttling valve 78), a flow meter 103 is positioned in the conduit 83 so that the flow rate of the rinse water (whether it be an upflow or downflow rinse) can be measured.

The table below illustrates the positions of the various valves during operation of the system. The valves 126, 152, 66, 86, 90 and 95 are two position valves and are either closed or open, depending on the operating mode of a given tank. The valves 50 and 56 are three-way valves and have two operative positions, one denoted as "service" and the other denoted as "regeneration". When the valve 50 is in the service position, the top of the tank is communicated with the conduit 40a and when in the regeneration position, the top of the tank is communicated to the conduit 44a. When the three-way valve 56 is in the service position, the bottom of the tank is communicated with the conduit 42a and when in the regeneration position, the bottom of the tank is communicated with the conduit 46a. The table illustrates the positions of the various valves when the tank is in a service mode, i.e., treating water, when the first regeneration solution is being conveyed into the tank, when the second regeneration solution is being conveyed into the tank and the positions the valves assume during the multiple rinse steps, including the step of flushing the injection conduit 120.

treated by each tank so that the frequency is directly related to the volume of source fluid passed through each tank. A "feed forward" type control can also be employed to control the frequency of regeneration of a tank. An example of a feed forward control that can be adapted to the disclosed deionization system is fully disclosed in U.S. Pat. No. 5,022,094, which is hereby incorporated by reference.

Referring to FIG. 1, each ion exchange subassembly includes the associated control panels 28, 34. Both panels, in turn, interface to the system control panel 36. In the illustrated embodiment, the control panels 28, 34 include valving and plumbing for controlling the regeneration of an exhausted tank. Each control panel is connected to the associated regeneration chemistry. In

| VALVE NO. | SERVICE | FIRST REGEN. SOLUTION | SECOND REGEN. SOLUTION | UP-SLOW RINSE CONDUIT FLUSH | UP RINSE | DOWN RINSE |
|---|---|---|---|---|---|---|
| 126 | Close | Open | Close | Close | Close | Close |
| 152 | Close | Close | Close | Open | Close | Close |
| 50 | Service | Regeneration | Regeneration | Regeneration | Regeneration | Service |
| 56 | Service | Regeneration | Regeneration | Regeneration | Regeneration | Regeneration |
| 66 | Close | Close | Open | Close | Close | Close |
| 86 | Close | Close | Open | Open | Close | Close |
| 90 | Close | Close | Close | Close | Open | Close |
| 95 | Close | Close | Close | Close | Close | Open |

In normal operation, all four tanks are in service and are actively treating fluid conveyed to the top of each tank by the associated branch conduit 40a. The quantity of fluid treated by a given tank is constantly monitored by the flow sensor 52. A Series 200 sensor and model 500 transmitter available from Data Industrial may be used to monitor the flow of fluid into each treatment tank. The system controller uses the influent information provided by the flow sensor to continuously calculate the "loading" of an associated treatment tank. Those skilled in the art will recognize the term "loading" to mean a quantity related to the number of sites in the resin bed containing a trapped ion (in the case of an ion exchange media) or a trapped particle (in the case of an organic adsorbent media). It should be understood that a given resin bed can trap a predetermined number of ions or particles at which point the resin is then considered exhausted and then requires regeneration. The method for determining when a tank or tanks require regeneration along with a full description of the system controller 36 is contracted in U.S. Pat. No. 5,069,779 which is hereby incorporated by reference.

The cation and anion tank sections (shown in FIGS. 1, 2A and 2B) are similarly, constructed and in some applications may be identical. The components of the anion subassembly 24 which are identical or similar to components used in the cation subassembly 22 are indicated by the same reference character followed by an apostrophe. As seen in FIG. 2B, the anion subassembly 24 is divided into a tank section 24a and a regeneration section 24b. The output of the cation unit 22 is conveyed to the anion unit 24 by the transfer conduit 37. The output of the anion unit is communicated to the plant DI reservoir through a supply conduit 38. In the illustrated embodiment, the quality of the treated water is monitored by a sensor 100 which may comprise a resistivity monitor.

In the disclosed embodiment, the regeneration frequency is determined by monitoring the flow of fluid particular and as seen in FIG. 1, the cation unit 22 is connected to the cation regeneration chemistry supply reservoir 35 which typically comprises an acid-based chemical whereas the anion unit 24 is connected to the anion regeneration chemistry reservoir 39 which is normally caustic based. The cation unit 22 is also connected to the source of recycled or lower grade regeneration solution 41.

Each control panel 28, 34 includes the support equipment for receiving data from the various flow sensors and a programmable controller for monitoring the loading of each tank, for determining when regeneration is necessary and for executing a regeneration cycle for an exhausted tank. In particular, the controller associated with each ion exchange unit is operative to control the upper and lower motorized, three way valves associated with each tank as well as the valves associated with the sources of regeneration chemistry.

Although the invention has been described with a certain degree of particularity, it should be understood that those skilled in the art can make various changes to it without parting from the spirit of scope of the invention as hereinafter claimed.

We claim:

1. A water treatment apparatus, comprising:
   a) a plurality of treatment tanks, each tank defining a first port and second port and containing a homogeneous treatment material defining a fluid flow path between said first and second ports;
   b) first valve associated with said first port of each tank and a second valve associated with said second port of each treatment tank;
   c) a source manifold for delivering fluid to be treated to said tanks;
   d) a receiving manifold for receiving treated fluid from said treatment tanks;
   e) a regeneration supply manifold for delivering a second regeneration solution to a treatment tank requiring regeneration;

f) a regeneration discharge manifold for receiving regeneration related fluids from said tanks;

g) said first valve of each tank selectively communicating either said source manifold or said regeneration discharge manifold with said first port of its associated tank; and, h) structure defining a fluid passage having an outlet that opens in said tank intermediate said first port and said second port such that a polishing zone is defined in said homogenous treatment material between said fluid passage outlet and said second port;

i) means for at least partially regenerating a non-polishing zone of said homogeneous treatment material with a first regeneration solution including a flow controller defining means for delivering a first regeneration solution to said outlet while permitting fluid flow out of said tank through said first port and concurrently inhibiting fluid flow out of said tank through said second port, such that said first regeneration solution is substantially constrained to flow through a non-polishing zone of said homogeneous treatment material:

j) said flow controller further defining means for communicating said supply manifold with said second tank port while communicating said discharge manifold with said first port such that a second regeneration solution is introduced at said second port and flows through said homogeneous treatment material along said flow path such that said polishing zone is regenerated and such that said non-polishing zone is more completely regenerated.

2. The apparatus of claim 1, wherein said tanks each contain a cation resin and form a cation section of a deionization system.

3. The apparatus of claim 1, wherein said tanks each contain a anion resin and form a anion section of a deionization system.

4. The apparatus of claim 1, wherein said second valve of each tank selectively communicates either said receiving manifold or said regeneration supply manifold with its associated second port.

5. The apparatus of claim 4, wherein said first and second valves comprise three way remotely controlled valves.

6. The apparatus of claim 4, wherein each of said tanks comprises an elongate upstanding, cylindrical structure having said first and second ports defined at opposite ends of each tank.

7. The apparatus of claim 6, wherein said structure defining a fluid passage comprises a conduit extending from a top of said tank and terminating a predetermined distance above the bottom of said tank whereby a "polishing zone" is defined in said resin bed.

8. The apparatus of claim 6, wherein said first port is defined near a top end of said tank and said second port is defined near a bottom end of said tank.

9. The apparatus of claim 4, wherein said source, receiving, regeneration supply and regeneration discharge manifolds comprise transversely extending common conduits coupled to said three way valves through branch conduits associated with each tank.

10. The apparatus of claim 9, further comprising a source of regeneration solution including regeneration control valves, said regeneration control valves selectively communicating said source of regeneration solution with said regeneration supply manifold.

11. A water treatment system, comprising:

a) structure supporting a plurality of treatment tanks, each tank including a resin bed containing a treatment material and defining a fluid flow path between a first port and a second port;

b) valving associated with said first port and said second port of each tank;

c) said valving connecting a source of water to be treated to said tanks and connecting a regeneration means to a tank requiring regeneration, and d) said regeneration means for regenerating a treatment tank, comprising:

i) means for introducing a first regeneration solution before a polishing zone defined in said resin bed, including means for inhibiting flow of said first regeneration solution through said polishing zone such that substantially all of said first regeneration solution travels through a non-polishing zone of said resin bed and at least partially regenerates said non-polishing zone of said treatment material;

ii) means for communicating a second regeneration solution to one of said ports and allowing said second regeneration solution to flow along said flow path from the one port to the other port, such that said entire resin bed is placed in contact with said second regeneration solution, such that said polishing zone is substantially regenerated and a non-polishing zone is more completely regenerated.

12. The water treatment system of claim 11, wherein said first regeneration solution is a reuse solution.

13. The apparatus of claim 12, wherein said tanks form a subassembly further including a source water manifold, a product receiving manifold, a regeneration supply manifold and a regeneration discharge manifold and said first and second valves control the communication of said manifolds with each of said tanks.

14. A treatment apparatus, comprising:

a) at least one treatment tank defining a fluid flow path between a first port and a second port, said treatment tank containing a homogeneous treatment material divided into a polishing zone and a non-polishing zone;

b) regeneration inlet member for introducing a first regeneration solution into said fluid flow path and having an outlet intermediate said first port and said second port, the location of said outlet determining the polishing zone of said homogeneous treatment material;

c) first conduit structure connected to said first port for delivering fluid to be treated to said tank;

d) second conduit structure connected to said second port for receiving treated fluid from said tank;

e) means for communicating said first regeneration solution to said inlet member while inhibiting fluid flow out of said tank through said second port and allowing fluid flow out of said tank through said first port such that said non-polishing zone of said homogeneous treatment material is at least partially regenerated;

f) means for communicating a source of second regeneration solution with said second port while inhibiting fluid flow into said inlet member and allowing fluid flow out of said tank through said first port, such that said second regeneration solution flows first through said polishing zone and then through said non-polishing zone such that said polishing zone is substantially regenerated and said non-polishing zone is more completely regenerated.

15. A water treatment apparatus, comprising:
a) at least one treatment tank defining a first port and a second port and including an ion exchange bed containing a treatment material having a common charge and defining a fluid flow path between said first and second port, said ion exchange bed divided into a polishing zone and a non-polishing zone;
b) regeneration inlet member for introducing a first regeneration solution into said fluid flow path and having an outlet intermediate said first port and said second port, the location of said outlet determining the polishing zone of said ion exchange bed;
c) first conduit structure connected to said first port for delivering water to be treated to said tank;
d) second conduit structure connected to said second port for receiving treated water from said tank;
e) means for communicating said first regeneration solution to said inlet member while inhibiting fluid flow out of said tank through said second port and allowing fluid flow out of said tank through said first port, such that said non-polishing zone of said ion exchange bed is at least partially regenerated;
f) means for communicating a source of second regeneration solution with said second port while inhibiting fluid flow into said inlet member and allowing fluid flow out of said tank through said first port, such that said second regeneration solution flows first through said polishing zone and then through said non-polishing zone such that said polishing zone is substantially regenerated and said non-polishing zone is more completely regenerated.

16. The apparatus of claim 15 wherein said treatment material is homogeneous through the tank.

* * * * *